US011915538B1

(12) United States Patent
Gorski et al.

(10) Patent No.: US 11,915,538 B1
(45) Date of Patent: Feb. 27, 2024

(54) TRILATERATION WITH ULTRA-WIDEBAND ANCHORS

(71) Applicant: Ford Global Technologies, LLC, Dearborn, MI (US)

(72) Inventors: Ryan Joseph Gorski, Grosse Pointe Farms, MI (US); Vivekanandh Elangovan, Canton, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/045,945

(22) Filed: Oct. 12, 2022

(51) Int. Cl.
*G07C 9/00* (2020.01)

(52) U.S. Cl.
CPC .................... *G07C 9/00309* (2013.01); *G07C 2009/00507* (2013.01); *G07C 2209/63* (2013.01)

(58) Field of Classification Search
None
See application file for complete search history.

(56) References Cited

U.S. PATENT DOCUMENTS

| | | | | |
|---|---|---|---|---|
| 9,953,185 | B2 * | 4/2018 | Bendersky | G06F 16/435 |
| 10,559,149 | B1 | 2/2020 | Kuechler | |
| 2009/0209289 | A1 * | 8/2009 | Miyazaki | G06F 8/60 455/558 |
| 2010/0076622 | A1 | 3/2010 | Dickerhoof et al. | |
| 2022/0070612 | A1 | 3/2022 | Henry et al. | |
| 2022/0070613 | A1 | 3/2022 | Barton et al. | |
| 2022/0070816 | A1 | 3/2022 | Henry et al. | |
| 2022/0123783 | A1 | 4/2022 | Lim | |

FOREIGN PATENT DOCUMENTS

| | | | |
|---|---|---|---|
| EP | 3974867 | A1 | 3/2022 |

OTHER PUBLICATIONS

Oman, "Get the Most out of UWB", APTIV, White Paper, https://www.aptiv.com/en/insights/article/get-the-most-out-of-uwb.

Hu et al., "Vehicle positioning based on UWB technology", 2017 J. Phys.: Conf. Ser. 887 012069, doi :10.1088/1742-6596/887/1/012069.

* cited by examiner

*Primary Examiner* — Carlos Garcia
(74) *Attorney, Agent, or Firm* — Frank Lollo; Bejin Bieneman PLC

(57) ABSTRACT

A computer includes a processor and a memory, and the memory stores instructions executable to determine a currently activatable feature on a vehicle from a plurality of features; establish negotiations between each of a plurality of Ultra-Wideband (UWB) anchors of the vehicle and at least one mobile device; select a search strategy based on the currently activatable feature; upon selecting the search strategy, during a search iteration, determine distance data to at least one mobile device from a subset of UWB anchors, and inhibit a remainder of the UWB anchors other than the subset; perform a trilateral calculation on the distance data for the mobile device; and actuate a component of the vehicle according to the currently activatable feature based on a result of the trilateral calculation.

20 Claims, 2 Drawing Sheets

TRILATERATION WITH ULTRA-WIDEBAND ANCHORS

BACKGROUND

Some vehicles can be unlocked or started with a digital key. A digital key, sometimes implemented with a smartphone or the like as what may be called phone-as-a-key, relies on communication between a mobile device such as a smartphone and the vehicle. When an app is activated on the mobile device and the mobile device is held at a particular location relative to the vehicle, such as next to the door handle, the vehicle unlocks the doors. A digital key may communicate with the vehicle using Bluetooth®, Near Field Communication, and/or Ultra-Wideband (UWB).

DETAILED DESCRIPTION

Figure 1:
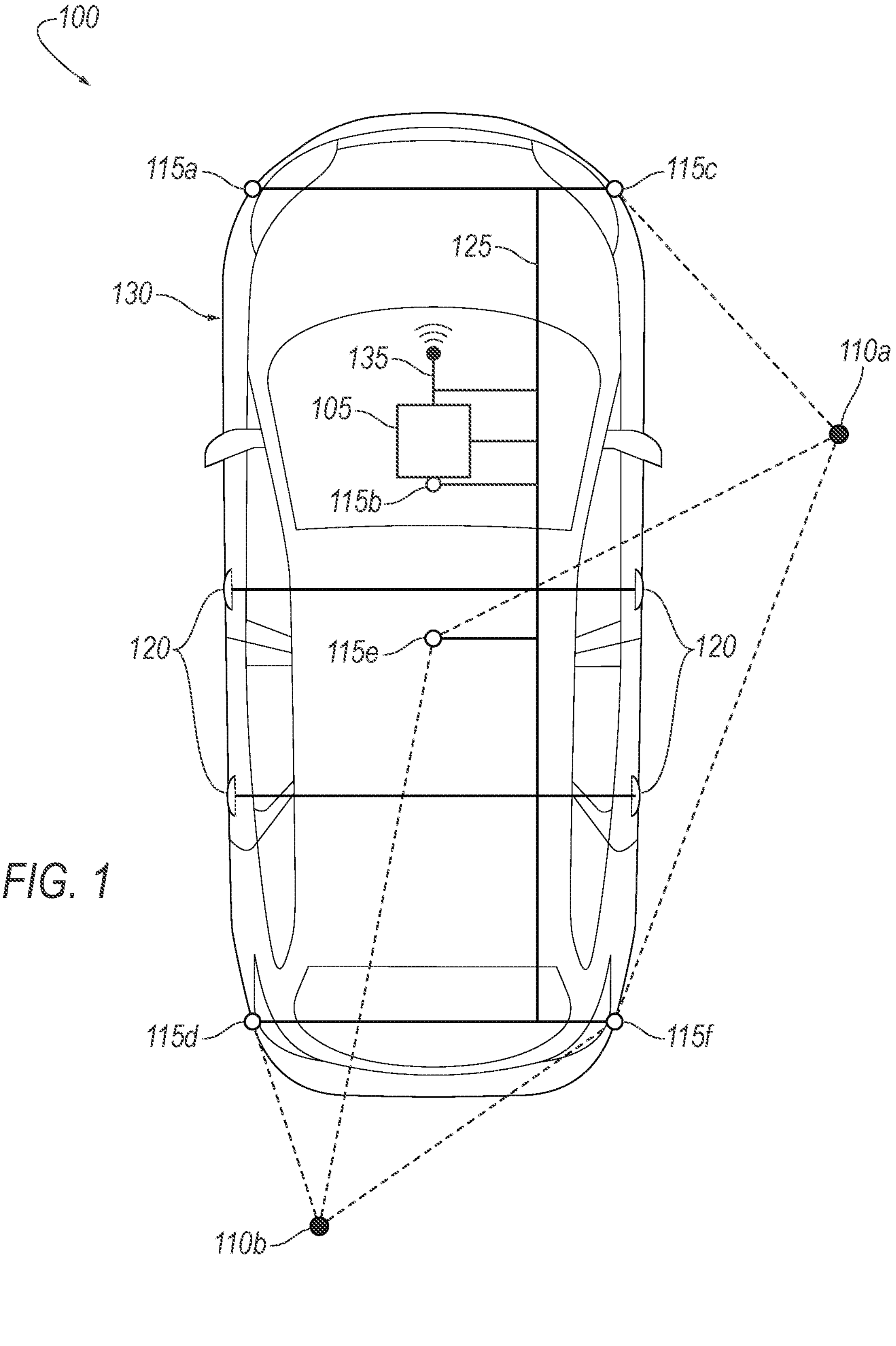
FIG. 1 is a top diagrammatic view of an example vehicle including a plurality of Ultra-Wideband (UWB) anchors.

Certain features of a vehicle may rely on the location of a mobile device, e.g., digital key, remote park assist, etc. A computer of the vehicle may perform a trilateral calculation to determine the location of the mobile device. The vehicle includes a plurality of Ultra-Wideband (UWB) anchors that communicate with the mobile device, which is also equipped with an UWB transceiver. The computer uses the UWB anchors to determine distance data, which may include distances between the mobile device and the respective UWB anchors, e.g., based on time-of-flight data between the mobile device and the UWB anchors. The trilateral calculation can be performed once at least three distances have been determined. Once the location of the mobile device is determined, the computer may actuate a vehicle component according to one of the features, e.g., unlocking the doors for the digital key or operating the vehicle for the remote park assist.

This disclosure provides techniques for determining the distance data from the UWB anchors to one or more mobile devices according to a search strategy. As used herein, a "search strategy" specifies which UWB anchors are used for determining the distance data at each search iteration. A computer of the vehicle stores a plurality of search strategies. For example, a default strategy is to determine the distance data from all the UWB anchors at each search iteration. Other search strategies described herein determine the distance data from subsets of the UWB anchors defined according to those search strategies while inhibiting a remainder of the UWB anchors. The computer is programmed to select the search strategy from the plurality of search strategies based on, e.g., which feature(s) are currently activatable, the quantity of energy remaining in batteries of the vehicle, etc. A feature is "currently activatable" if the situational requirements for using the feature are satisfied; for example, for the feature of unlocking the vehicle with a digital key, the situational requirements are that the vehicle is locked, and for the feature of remote park assist, the situational requirements are that the vehicle is running and either in park or already moving for the remote park assist. Selecting between multiple search strategies can provide performance tailored to the currently activatable feature. Using a search strategy that inhibits some of the UWB anchors each search iteration saves energy and/or processing burden on the computer (compared to using the default strategy) while still providing a sufficiently accurate location for the currently activatable feature. Some search strategies may be faster than the default search strategy to search all mobile devices when new mobile devices are connected. Moreover, reducing the number of UWB anchors may increase a probability of successfully determining the distance data in a congested space having a high amount of UWB noise.

A computer includes a processor and a memory, and the memory stores instructions executable to determine a currently activatable feature on a vehicle from a plurality of features; establish negotiations between each of a plurality of Ultra-Wideband (UWB) anchors of the vehicle and at least one mobile device; select a search strategy from a plurality of search strategies based on the currently activatable feature; upon selecting a first strategy as the search strategy, during a search iteration, determine distance data to the at least one mobile device from a first subset of the UWB anchors of the vehicle, and inhibit a remainder of the UWB anchors other than the first subset, wherein the first strategy defines the first subset; perform a trilateral calculation on the distance data for the at least one mobile device; and actuate a component of the vehicle according to the currently activatable feature based on a result of the trilateral calculation.

In an example, the first strategy may define the first subset to include different ones of the UWB anchors at consecutive search iterations. In a further example, the first strategy may define the first subset to include a same number of the UWB anchors at consecutive search iterations. In a yet further example, the number of the UWB anchors in the first subset may be one.

In another yet further example, the number of the UWB anchors in the first subset may be greater than one and less than all the UWB anchors.

In another further example, the first strategy may define the first subset according to a preset sequence specifying the UWB anchors for each search iteration. In a yet further example, the preset sequence may include all the UWB anchors in the first subset over a number of consecutive search iterations.

In another yet further example, the at least one mobile device may include a first mobile device and a second mobile device, the first strategy may define a first sub-subset of the first subset to determine the distance data from the first mobile device and a second sub-subset of the first subset to determine the distance data from the second mobile device, and a first one of the UWB anchors may be in the first sub-subset and in the second sub-subset in different ones of the search iterations.

In another yet further example, the at least one mobile device may include a first mobile device and a second mobile device, the first strategy may define a first sub-subset of the first subset to determine the distance data from the first mobile device and a second sub-subset of the first subset to determine the distance data from the second mobile device, the first sub-subset may include a first one of the UWB anchors in at least one of the search iterations of the preset sequence, and the first sub-subset may be a null set in a remainder of the search iterations of the preset sequence. In a still yet further example, the second sub-subset may exclude the first one of the UWB anchors.

In another further example, the instructions may further include instructions to, upon selecting the first strategy as the search strategy, during a next search iteration, deselect at least one of the UWB anchors from the first subset based on a distance from the UWB anchor to the at least one mobile device. In a yet further example, the instructions may further include instructions to continue excluding the deselected one of the UWB anchors from the first subset after the next search iteration.

In another yet further example, the instructions may further include instructions to, upon selecting the first strategy as the search strategy, during an initial search iteration, determine the distance data to the at least one mobile device from all the UWB anchors of the vehicle.

In an example, the instructions may further include instructions to actuate the component of the vehicle according to the currently activatable feature based directly on a distance from the distance data.

In an example, the at least one mobile device may include a first mobile device and a second mobile device, and the first strategy may define a first sub-subset of the first subset to determine the distance data from the first mobile device and a second sub-subset of the first subset to determine the distance data from the second mobile device.

In an example, the instructions may further include instructions to, before selecting the search strategy, establish the negotiations using a Bluetooth® Low Energy (BLE) transceiver.

In an example, the plurality of the features may include at least one of (1) proximity-based unlocking of the vehicle, (2) actuating the component on approach of the at least one mobile device to the vehicle, or (3) remote park assist.

In an example, the plurality of the search strategies may include a default strategy, and the instructions may further include instructions to, upon selecting the default strategy as the search strategy, during the search iteration, determine the distance data to the at least one mobile device from all the UWB anchors of the vehicle.

A computer includes a processor and a memory, and the memory stores instructions executable to determine a currently activatable feature on a vehicle from a plurality of features; select a search strategy from a plurality of search strategies based on the currently activatable feature; upon selecting a first strategy as the search strategy, during a search iteration, determine distance data to at least one mobile device from a first subset of a plurality of Ultra-Wideband (UWB) anchors of the vehicle, and inhibit a remainder of the UWB anchors other than the first subset, wherein the first strategy defines the first subset; perform a trilateral calculation on the distance data for the at least one mobile device; and actuate a component of the vehicle according to the currently activatable feature based on a result of the trilateral calculation. The first strategy one of (1) defines the first subset to have a number of the UWB anchors equal to one, (2) defines a first sub-subset of the first subset to determine the distance data from a first mobile device of the at least one mobile device and a second sub-subset of the first subset to determine the distance data from a second mobile device of the at least one mobile device, or (3) during a next search iteration, deselects at least one of the UWB anchors from the first subset.

A method includes determining a currently activatable feature on a vehicle from a plurality of features; establishing negotiations between each of a plurality of Ultra-Wideband (UWB) anchors of the vehicle and at least one mobile device; select a search strategy from a plurality of search strategies based on the currently activatable feature; upon selecting a first strategy as the search strategy, during a search iteration, determine distance data to the at least one mobile device from a first subset of the UWB anchors, and inhibit a remainder of the UWB anchors other than the first subset, wherein the first strategy defines the first subset; perform a trilateral calculation on the distance data for the at least one mobile device; and actuate a component of the vehicle according to the currently activatable feature based on a result of the trilateral calculation.

With reference to the Figures, wherein like numerals indicate like parts throughout the several views, a computer 105 includes a processor and a memory, and the memory stores instructions executable to determine a currently activatable feature on a vehicle 100 from a plurality of features; establish negotiations between each of a plurality of Ultra-Wideband (UWB) anchors 115 of the vehicle 100 and at least one mobile device 110; select a search strategy from a plurality of search strategies based on the currently activatable feature; upon selecting a first strategy as the search strategy, during a search iteration, determine distance data to at least one mobile device 110 from a first subset of the UWB anchors 115, and inhibit a remainder of the UWB anchors 115 other than the first subset; perform a trilateral calculation on the distance data for the mobile device 110; and actuate a component 120 of the vehicle 100 according to the currently activatable feature based on a result of the trilateral calculation. The first strategy defines the first subset.

With reference to FIG. 1, the vehicle 100 may be any passenger or commercial automobile such as a car, a truck, a sport utility vehicle, a crossover, a van, a minivan, a taxi, a bus, etc.

The computer 105 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 105 can thus include a processor, a memory, etc. The memory of the computer 105 can include media for storing instructions executable by the processor as well as for electronically storing data and/or databases, and/or the computer 105 can include structures such as the foregoing by which programming is provided. The computer 105 can be multiple computers coupled together.

The computer 105 may transmit and receive data through a communications network 125 such as a controller area network (CAN) bus, Ethernet, WiFi, Local Interconnect Network (LIN), onboard diagnostics connector (OBD-II), and/or by any other wired or wireless communications network. The computer 105 may be communicatively coupled to the UWB anchors 115, a transceiver 135, and other components 120 via the communications network 125.

The UWB anchors 115 communicate wirelessly with the mobile device 110 using radio waves. The UWB anchors 115 use an ultra-wideband signal, e.g., a signal with a low energy level spread over a large range of the radio spectrum. The Federal Communications Commission and the International Telecommunications Union Radiocommunication Sector define ultra-wideband as an antenna transmission for which emitted signal bandwidth exceeds the lesser of 500 MHz or 20% of the arithmetic center frequency. The UWB anchors 115 may use any suitable modulation method, e.g., orthogonal frequency-division multiplexing (OFDM), phase-shift keying (PSK), pulse-position modulation (PPM), etc.

The UWB anchors 115 are mounted to a body 130 of the vehicle 100. The number of UWB anchors 115 is at least four, e.g., six. As shown in the example of FIG. 1, the UWB anchors 115 include a first UWB anchor 115*a*, a second UWB anchor 115*b*, a third UWB anchor 115*c*, a fourth UWB anchor 115*d*, a fifth UWB anchor 115*e*, and a sixth UWB anchor 115*f*. The UWB anchors 115 are spaced apart from each other, e.g., spread over the body 130 of the vehicle 100, to increase the ability to distinguish a location when used for trilateration (as described below). For example, four of the UWB anchors 115 may be located at respective corners of the vehicle 100 to maximize the horizontal spread of the UWB anchors 115, and the remaining two anchors may be located internally to a footprint of the vehicle 100 at different heights than the corner-mounted UWB anchors 115 to provide a vertical spread.

The transceiver 135 may be adapted to transmit signals wirelessly through a different communication protocol than what is used by the UWB anchors 115, such as cellular, Bluetooth®, Bluetooth® Low Energy (BLE), WiFi, IEEE 802.11a/b/g/p, cellular-V2X (CV2X), Dedicated Short-Range Communications (DSRC), etc. The transceiver 135 is adapted to communicate using a protocol that is also used by the mobile device 110. In particular, the transceiver 135 may use BLE. The transceiver 135 may be one device or may include a separate transmitter and receiver.

The UWB anchors 115 and the transceiver 135 may communicate with at least one mobile device 110. The mobile devices 110 are portable computing devices such as smart keyfobs; mobile phones, e.g., smartphones; wearable devices, e.g., smartwatches, headsets, etc.; or tablets. The mobile devices 110 are computing devices including respective processors and respective memories. The mobile devices 110 may be owned and carried by respective persons who may be operators and/or owners of the vehicle 100.

The computer 105 may be programmed to establish a connection between the vehicle 100 and at least one mobile device 110, e.g., using the transceiver 135. The connection may include negotiations between each UWB anchor 115 and each mobile device 110. Each negotiation identifies the UWB anchor 115 to the mobile device 110 and then identifies the mobile device 110 to the UWB anchor 115, permitting signals to be transmitted between the UWB anchor 115 and the mobile device 110. The computer 105 may establish respective connections with multiple mobile devices 110 if multiple mobile devices 110 are within range of the transceiver 135. In the example of FIG. 1, the computer 105 has established connections with two mobile devices 110, a first mobile device 110*a* and a second mobile device 110*b*. The computer 105 is programmed to establish the connection(s) before selecting the search strategy and determining distance data, described below. Establishing the negotiations with all the UWB anchors 115 permits different UWB anchors 115 to be used at different search iterations, as described below. The negotiations remain intact when individual UWB anchors 115 are inhibited.

The vehicle 100 may have of a plurality of features for which the location or proximity of the mobile device 110 is used. The features may include at least one of proximity-based unlocking of the vehicle 100, actuating a component 120 on approach of a mobile device 110 to the vehicle 100, or remote park assist. The proximity-based unlocking may unlock the vehicle 100 in response to the mobile device 110 being within a threshold distance from the vehicle 100, either as soon as the mobile device 110 comes within the threshold distance or in response to an input to the mobile device 110 or the vehicle 100 when the mobile device 110 is within the threshold distance. An app may be installed on the mobile device 110 through which the input can be provided. The app may permit inputs to perform other operations such as starting the vehicle 100. The other operations may be conditional on the mobile device 110 being within the threshold distance of the vehicle 100. Actuating a component 120 on approach of the mobile device 110 to the vehicle 100 may actuate a component 120 in response to the mobile device 110 being within a threshold distance from the vehicle 100, e.g., as soon as the mobile device 110 comes within the threshold distance. Actuating the component 120 may relate to making the passenger cabin comfortable for the occupant, e.g., turning on air conditioning, heating, and/or a heated seat or steering wheel, and/or moving a seat to a preset position. The remote park assist autonomously navigates the vehicle 100 into or out of a parking spot.

The vehicle 100 includes the components 120 that are actuatable according to the features. For example, for proximity-based unlocking, the component 120 is the door locks, as illustrated in FIG. 1. For actuating the component 120 on approach, the components 120 may include the air conditioning, the heating system, and/or the seats. For the remote park assist, the components 120 may include the propulsion system, the braking system, and the steering system. The computer 105 is programmed to actuate the components 120 according to the features; i.e., the features include programming executed by the computer 105 to actuate the components 120.

The computer 105 is programmed to determine a currently activatable feature from the plurality of features. A feature is "currently activatable" if the situational requirements for using the feature are satisfied; for example, for the feature of unlocking the vehicle 100 with a digital key, the situational requirements are that the vehicle 100 is locked, and for the feature of remote park assist, the situational requirements are that the vehicle 100 is running and in park. Other features may have more detailed situational requirements. For each feature, the computer 105 may determine whether the situational requirements of that feature are satisfied. The situational requirements of different features may overlap, be independent, and/or be mutually exclusive. At a given time, no features, one feature, or multiple features may be currently activatable.

The computer 105 may be programmed to determine a power state of the vehicle 100. A power state defines the energy that the vehicle 100 is capable of providing. The power state may include one or more charge levels of batteries of the vehicle 100. The batteries may include a low-voltage battery and, if the vehicle 100 is a hybrid vehicle or battery-electric vehicle, high-voltage batteries. If the vehicle 100 has an internal-combustion engine, the power state includes whether the engine is running.

The computer 105 is programmed to determine distance data to at least one mobile device 110 from some or all of the UWB anchors 115. The distance data may include respective distances from the UWB anchors 115 to the at least one mobile device 110. For example, the mobile device 110 may transmit a query, and a UWB anchor 115 may, in response to receiving the query, transmit a response to the mobile device 110, possibly with other steps performed and/or messages sent between the query and the response. Alternatively, a UWB anchor 115 may transmit a query, and the mobile device 110 may, in response to receiving the query, transmit a response to that UWB anchor 115. The computer 105 may determine a distance from the UWB anchor 115 to the mobile device 110 based on the time between transmitting the query and receiving the response and a known speed at which the transmissions travel.

The computer 105 may instruct all or a subset of the UWB anchors 115 to transmit the queries at regular search iterations. The length of the search iteration may be chosen based on the time needed to collect the time-of-flight data and determine the distances and/or based on an industry standard, e.g., Digital Key Release 3 promulgated by the Connected Car Consortium, e.g., 96 milliseconds. Which UWB anchors 115 are included in the subset each search iteration is described in detail below.

The computer 105 is programmed to perform a trilateral calculation on the distance data for the mobile device 110. A trilateral calculation includes determining location information for an unknown point based on distances from known points. Specifically, the location of the unknown point may be an intersection of at least three spheres with known radiuses and center points. The location of the mobile device 110 may be the unknown point, and each sphere is defined by the known location of a UWB anchor 115 and the known distance from that UWB anchor 115 to the mobile device 110. The computer 105 may determine the location of the mobile device 110 using known algorithms for solving three quadratic equations with three unknown variables.

The distances used in the trilateral calculation may come from the same search iteration or from multiple search iterations, e.g., two or three consecutive search iterations. For example, the computer 105 may use distances from a minimum number of search iterations to collect at least three distances from unique UWB anchors 115, e.g., one search iteration if the subset has at least three UWB anchors 115, two search iterations if the subset has two UWB anchors 115, or three search iterations if the subset has one UWB anchor 115. If the distances come from multiple search iterations, then the UWB anchors 115 used in respective search iterations may be different from each other to ensure that at least three different UWB anchors 115 are used in the trilateral calculation. If the distances come from multiple search iterations, then the computer 105 may perform the trilateral calculation on a rolling basis beginning when at least three different UWB anchors 115; e.g., for a subset having one UWB anchor 115, the computer 105 may perform the trilateral calculation at every search iteration using the three most recent search iterations, beginning on the third search iteration. Using the rolling basis may be faster than other options and may have less uncertainty. Alternatively, the computer 105 may wait until three new unique distances from the UWB anchors 115 are available, or until distances from all the UWB anchors 115 are available.

The computer 105 may be programmed to determine an uncertainty of the result of the trilateral calculation, e.g., based on uncertainties of the distances used in the trilateral calculation and/or on the number of distances used in the trilateral calculation. Each distance may have a baseline uncertainty. The baseline uncertainty may be a preset value chosen based on physical limitations of the UWB anchors 115. The computer 105 may use the baseline uncertainty for distances from a most recent search iteration and may use larger uncertainties for distances from earlier search iterations. The value of the larger uncertainty for a distance may be determined based on a number of search iterations from a current search iteration to the search iteration at which the distance was determined, e.g., zero search iterations back if the distance was determined at the current search iteration, one search iteration back if the distance was determined at the immediately previous search iteration, etc. Thus, the result of a trilateral calculation using distances from multiple search iterations will have a greater uncertainty than the result of a trilateral calculation using distances from the same search iteration. The computer 105 may reduce the uncertainty of the result by using more than three distances rather than three distances.

The computer 105 stores a plurality of search strategies. Each search strategy defines a subset of the UWB anchors 115 and how the composition of the subset changes between consecutive search iterations. The computer 105 is programmed to, upon selecting a search strategy, during a search iteration, determine the distance data to at least one mobile device 110 from a subset of the UWB anchors 115 defined by the selected search strategy, and inhibit a remainder of the UWB anchors 115 other than the subset. Determining the distance data is performed in the manner described above, resulting in a distance for each UWB anchor 115 in the subset to a mobile device 110. Inhibiting the remainder of the UWB anchors 115, i.e., all the UWB anchors 115 of the vehicle 100 not in the subset, is performed by instructing those UWB anchors 115 to refrain from transmitting a query to a mobile device 110, thereby saving the energy that would be expended by transmitting the query and interpreting the response. The negotiations between the inhibited UWB anchors 115 and the mobile devices 110 remain valid and may be used to collect the time-of-flight data and determine the distance data if the inhibited UWB anchors 115 are included in the subset in later search iterations.

The plurality of the search strategies may include a default strategy. The computer 105 is programmed to, upon selecting the default strategy as the search strategy, during each search iteration, determine the distance data to at least one mobile device 110 from all the UWB anchors 115 of the vehicle 100. For example, the default strategy may be to determine the distance data to one mobile device 110 from all the UWB anchors 115 each search iteration. If connections have been established with multiple mobile devices 110, the computer 105 may cycle through the different mobile devices 110 over consecutive search iterations, e.g., if three mobile devices 110 are connected, a first mobile device 110*a* during a first search iteration, a second mobile device 110*b* during a second search iteration, a third mobile device 110 (not shown in FIG. 1) during a third search iteration, the first mobile device 110*a* during a fourth search iteration, and so on.

The search strategies include multiple nondefault strategies. The nondefault strategies define subsets for each search iteration. Each subset is a group of fewer than all the UWB anchors 115. The nondefault strategies may define the respective subsets to include different ones of the UWB anchors 115 at consecutive search iterations; i.e., for a given nondefault strategy, the subset changes from search iteration to search iteration. The nondefault strategies may define the respective subsets to include a same number of the UWB anchors 115 at consecutive search iterations; i.e., how many UWB anchors 115 are in the subset may be constant across search iterations, thereby keeping the energy consumption predictable. The constant number of UWB anchors 115 in a subset may be different for different nondefault strategies, thereby permitting a choice of the rate of energy consumption. For example, a first strategy may include a different UWB anchor 115 each search iteration, a second strategy may include a different three UWB anchors 115 each search iteration, and a third strategy may include a different four UWB anchors 115 each search iteration.

One or more of the search strategies may define the respective subsets according to a preset sequence specifying the UWB anchors 115 for each search iteration. The preset sequence may include the same number of UWB anchors 115 in the subset at consecutive search iterations. The preset sequence may include all the UWB anchors 115 in the subset over a number of consecutive search iterations, thereby maintaining the negotiations between the UWB anchors 115 and the connected mobile devices 110. The computer 105 may cycle through the preset sequence repeatedly.

As a first example of a preset sequence, the number of the UWB anchors 115 in the subset may be one. The computer 105 may cycle through all the UWB anchors 115 over a number of search iterations, e.g., over a number of search iterations equal to the number of UWB anchors 115 on the vehicle 100. Table 1 shows an example indicating which of the first UWB anchor 115*a* through the sixth UWB anchor 115*f* are used to determine distance data over six search iterations numbered 1 through 6. The UWB anchors 115 are arranged in the columns, and the search iterations are arranged in the rows. The UWB anchor 115 that is active each search iteration is marked with an "X," and the inhibited UWB anchors 115 each search iteration are left blank.

TABLE 1

| | First | Second | Third | Fourth | Fifth | Sixth |
|---|---|---|---|---|---|---|
| 1 | X | | | | | |
| 2 | | X | | | | |
| 3 | | | X | | | |
| 4 | | | | X | | |
| 5 | | | | | X | |
| 6 | | | | | | X |

As a second example of a preset sequence, the number of the UWB anchors 115 in the subset may be greater than one and less than all the UWB anchors 115, e.g., for six UWB anchors 115 on the vehicle 100, two to five UWB anchors 115 in the subset each search iteration. The second example preset sequence may determine sufficient distance data more quickly than the first example preset sequence while saving energy compared to the default strategy. The computer 105 may cycle through all the UWB anchors 115 over a number of search iterations, e.g., three search iterations for six total UWB anchors 115 with two UWB anchors 115 in the subset each search iteration. The computer 105 may store multiple search strategies conforming to the second example, e.g., with a different number of UWB anchors 115 each search iteration, e.g., one with two UWB anchors 115 each search iteration, one with three UWB anchors 115 each search iteration, one with four UWB anchors 115 each search iteration, and one with five UWB anchors 115 each search iteration. Table 2 shows an example with two UWB anchors 115 each search iteration indicating which of the first UWB anchor 115*a* through the sixth UWB anchor 115*f* are used to determine distance data over three search iterations. The UWB anchors 115 are arranged in the columns, and the search iterations are arranged in the rows. The UWB anchors 115 that are active each search iteration are marked with an "X," and the inhibited UWB anchors 115 each search iteration are left blank.

TABLE 2

| | First | Second | Third | Fourth | Fifth | Sixth |
|---|---|---|---|---|---|---|
| 1 | X | X | | | | |
| 2 | | | X | X | | |
| 3 | | | | | X | X |

As a third example of a preset sequence, the subset each search iteration may be divided into multiple sub-subsets corresponding to respective mobile devices 110. For example, the subset each search iteration may include a first sub-subset for determining distance data from the first mobile device 110*a* and a second sub-subset for determining distance data from the second mobile device 110*b*. At least one of the UWB anchors 115, e.g., all the UWB anchors 115, may be in multiple sub-subsets at different search iterations, e.g., in the first sub-subset in one search iteration and in the second sub-subset in a later search iteration. The computer 105 may store multiple search strategies conforming to the third example, e.g., with a different number of UWB anchors 115 each search iteration. Table 3 shows an example indicating which of the first UWB anchor 115*a* through the sixth UWB anchor 115*f* are used to determine distance data from the first mobile device 110*a* and the second mobile device 110*b* over three search iterations. The UWB anchors 115 are arranged in the columns, and the search iterations are arranged in the rows. The UWB anchors 115 that are active each search iteration are marked with "First" or "Second" to indicate which mobile device 110 the UWB anchors 115 are collecting time-of-flight data from, and the inhibited UWB anchors 115 each search iteration are left blank.

TABLE 3

| | First | Second | Third | Fourth | Fifth | Sixth |
|---|---|---|---|---|---|---|
| 1 | First | Second | | | | |
| 2 | | First | Second | | | |
| 3 | | | First | Second | | |
| 4 | | | | First | Second | |
| 5 | | | | | First | Second |
| 6 | Second | | | | | First |

As a fourth example of a preset sequence, the subset each search iteration may be divided into multiple sub-subsets corresponding to respective mobile devices 110. For example, the subset each search iteration may include a first sub-subset for determining distance data from the first mobile device 110*a* and a second sub-subset for determining distance data from the second mobile device 110*b*. The sub-subsets may include one of the mobile devices 110 in at least one of the search iterations and may be a null set in at least one of the search iterations. Each sub-subset may exclude at least one of the UWB anchors 115, e.g., all but one of the UWB anchors 115, in all the search iterations of the preset sequence. For example, each mobile device 110 may communicate with one of the UWB anchors 115 in some search iterations and not communicate with any of the UWB anchors 115 in the remaining search iterations of the preset sequence. This fourth example of the preset sequence may be used when the currently activatable feature uses a distance rather than a location. The fourth example only provides data for calculating the distance, not the location, and the fourth example has a lower energy consumption than other search strategies. The computer 105 may be programmed to actuate the component 120 according to the currently activatable feature based directly on one or more of the distances from the distance data, rather than based on the location resulting from the trilateral calculation. Table 4 shows an example indicating which of the first UWB anchor 115*a* through the sixth UWB anchor 115*f* are used to determine distance data from the first mobile device 110*a*, the second mobile device 110*b*, and the third mobile device 110 (not shown in FIG. 1) over six search iterations. The UWB anchors 115 are arranged in the columns, and the search iterations are arranged in the rows. The UWB anchors 115 that are active each search iteration are marked with "First," "Second," or "Third" to indicate which mobile device 110 the UWB anchors 115 are collecting time-of-flight data from, and the inhibited UWB anchors 115 each search iteration are left blank. In the example of Table 4, the first sub-subset (corresponding to the first mobile device 110*a*) includes the first UWB anchor 115*a* in the first and fourth search iterations and is a null set in the second, third, fifth, and sixth search iterations.

TABLE 4

| | First | Second | Third | Fourth | Fifth | Sixth |
|---|---|---|---|---|---|---|
| 1 | First | | | | | |
| 2 | | Second | | | | |
| 3 | | | Third | | | |
| 4 | First | | | | | |
| 5 | | Second | | | | |
| 6 | | | Third | | | |

One or more of the search strategies may define the respective subsets by determining a distance from one of the UWB anchors 115 to the mobile device 110 and, during a next search iteration, deselecting the UWB anchor 115 from the subset based on the distance. The distance between the UWB anchor 115 and the mobile device 110 may be determined from the time-of-flight data between the UWB anchor 115 and the mobile device 110 or from the known location of the UWB anchor 115 and the location of the mobile device 110 as determined from the trilateral calculation. For example, the computer 105 may deselect the UWB anchor 115 from the subset in response to the distance being greater than a preset number of distances from the other UWB anchors 115 to the same mobile device 110. The preset number may be at least three, e.g., three or four, so that a sufficient number of the UWB anchors 115 remain for the computer 105 to determine the location of the mobile device 110 with the trilateral calculation. The computer 105 may be programmed to continue excluding the deselected one of the UWB anchors 115 from the subset after the next search iteration. For example, the computer 105 may exclude the deselected one of the UWB anchors 115 from the subset for subsequent search iterations until the distance between the deselected one of the UWB anchors 115 and the mobile device 110 is no longer greater than the preset number of distances from the other UWB anchors 115 to the same mobile device 110.

One or more of the search strategies may define the respective subsets by combining the deselection of UWB anchors 115 based on distance to the mobile device 110 with one of the preset sequences described above. For example, the computer 105 may determine distance data to the mobile device 110 from a subset of the UWB anchors 115 defined according to one of the preset sequences described above. The computer 105 may deselect one or more of the UWB anchors 115 based on the distance(s) between those UWB anchor(s) 115 and the mobile device 110. Then, when the subset during a search iteration includes one of the deselected UWB anchors 115, the computer 105 may skip that search iteration and instead use the subset from the next search iteration, or the computer 105 may perform that search iteration while inhibiting the deselected UWB anchor 115. Tables 5 and 6 show the computer 105 following the example of the preset sequence in Table 2 above with the third and fourth UWB anchors 115*c*—d deselected. In Table 5, the computer 105 skips the search iteration for which the subset includes the third and fourth UWB anchors 115*c*—d.

TABLE 5

| | First | Second | Third | Fourth | Fifth | Sixth |
|---|---|---|---|---|---|---|
| 1 | X | X | | | | |
| 2 | | | | | X | X |

In Table 6, the computer 105 still performs the search iteration including the third and fourth UWB anchors 115*c*—d in the subset with the third and fourth UWB anchors 115*c*—d inhibited.

TABLE 6

| | First | Second | Third | Fourth | Fifth | Sixth |
|---|---|---|---|---|---|---|
| 1 | X | X | | | | |
| 2 | | | | | | |
| 3 | | | | | X | X |

Deselecting the UWB anchors 115 may instead be combined with any of the other examples of preset sequences described above.

The computer 105 may be programmed to, during an initial search iteration, determine the distance data to the mobile device 110 from all the UWB anchors 115 of the vehicle 100, e.g., upon selecting a search strategy that includes deselecting UWB anchors 115. Determining the distance data from all the UWB anchors 115 permits the distances from the UWB anchors 115 to the mobile device 110 to be determined after a single search iteration, so some of the UWB anchors 115 may be deselected upon the second search iteration.

The computer 105 may be programmed to select a search strategy from the plurality of search strategies based on the currently activatable feature. For example, the computer 105 may store a lookup table pairing the features with the search strategies. The computer 105 may determine the currently activatable feature and then select the search strategy paired with that feature in the lookup table. If there is no currently activatable feature, the computer 105 may inhibit all the UWB anchors 115. If there are multiple currently activatable features, then the computer 105 may select the search strategy with the highest accuracy from the search strategies paired with the currently activatable features. A search strategy may be chosen for each currently activatable feature in the lookup table based on the lowest energy consumption or processing burden from the search strategies that provide a sufficiently low uncertainty for the trilateral calculation for that currently activatable feature. For another example, the computer 105 may store a plurality of maximum uncertainties associated with the respective features, and the computer 105 may select the search strategy with the lowest energy consumption from the search strategies that have uncertainties less than the maximum uncertainty of the currently activatable feature.

Alternatively or additionally, the computer 105 may be programmed to select a search strategy based on the power state of the vehicle 100. For example, the lookup table may include multiple search strategies paired with each currently activatable feature, the computer 105 may select a search strategy with a lower energy consumption from the paired search strategies if the power state indicates less available energy on the vehicle 100.

Figure 2:
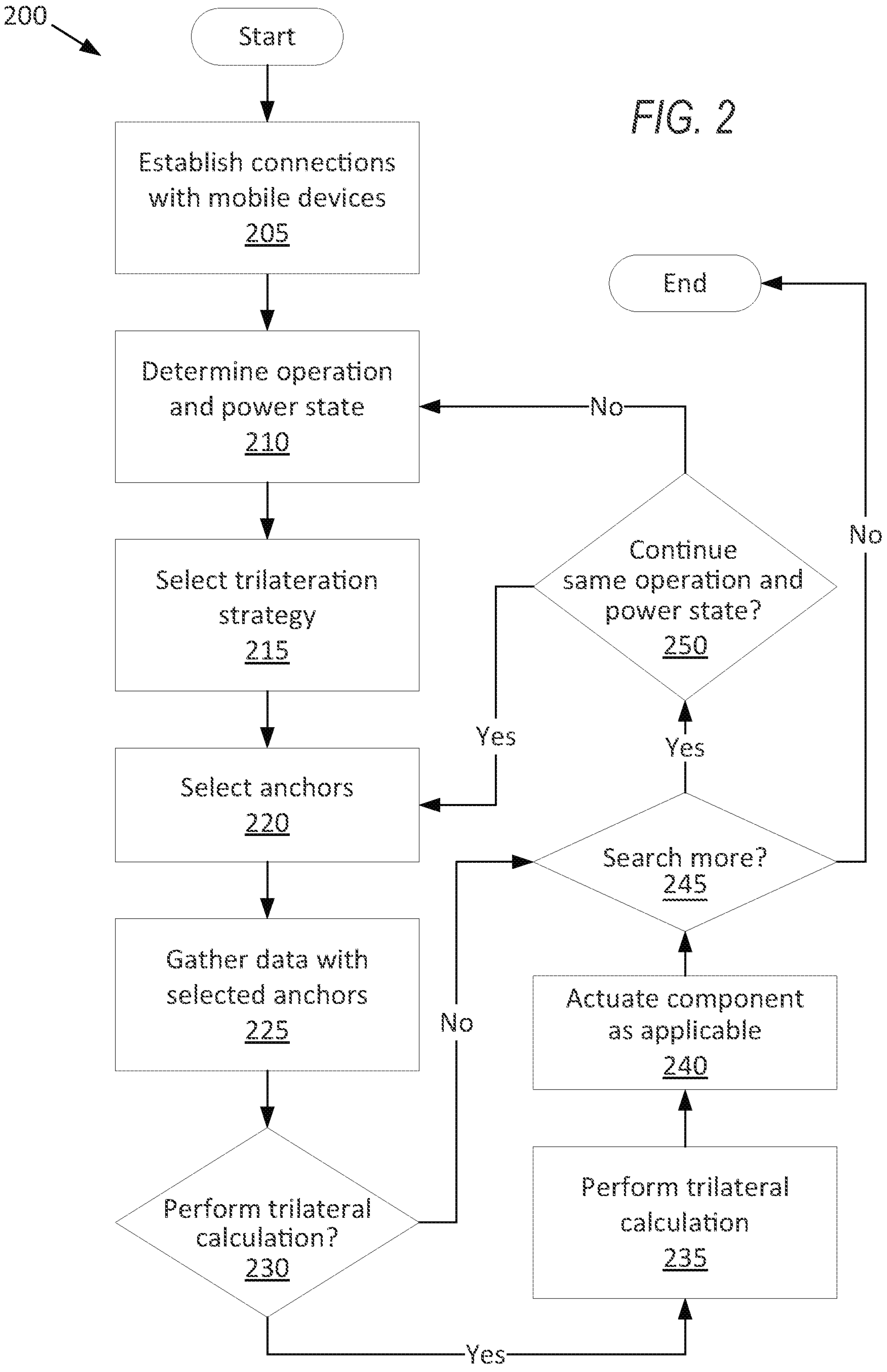
FIG. 2 is a process flow diagram of an example process for trilateration of a mobile device using the UWB anchors.

FIG. 2 is a process flow diagram illustrating an example process 200 for trilateration of a mobile device 110 using the UWB anchors 115. The memory of the computer 105 stores executable instructions for performing the steps of the process 200 and/or programming can be implemented in structures such as mentioned above. As a general overview of the process 200, the computer 105 establishes connections with the mobile devices 110, determines the currently activatable feature and power state, and selects the search strategy. For as long as the currently activatable feature and the power state remain the same, for each search iteration, the computer 105 determines the subset, determines the distance data from the UWB anchors 115 in the subset, and, if sufficient distance data has been collected, performs the trilateral calculation and actuates the component 120 according to the currently activatable feature based on the result of the trilateral calculation.

The process 200 begins in a block 205, in which the computer 105 establishes the connection(s) between the vehicle 100 and the at least one mobile device 110, e.g., using the transceiver 135, as described above.

Next, in a block 210, the computer 105 determines the currently activatable feature(s) from the plurality of features and the power state of the vehicle 100, as described above.

Next, in a block 215, the computer 105 selects the search strategy from the plurality of search strategies based on the currently activatable feature and/or the power state, as described above.

Next, in a block 220, the computer 105 determines the UWB anchors 115 that are in the subset for the current search iteration, as defined by search strategy selected in the block 215, as described above.

Next, in a block 225, the computer 105 determine the distance data from the UWB anchors 115 in the subset as determined in the block 220, as described above.

Next, in a decision block 230, the computer 105 determines whether the trilateral calculation will be performed for the current search iteration. The computer 105 may perform the trilateral calculation when sufficient distance data has been gathered for the trilateral calculation. For example, if the currently activatable feature relies on the location of the mobile device 110, then distances are required from at least three UWB anchors 115 to the mobile device 110. If the number of UWB anchors 115 in the subset is one, then sufficient distance data will be available only after at least three search iterations, e.g., then on a rolling basis at each search iteration thereafter. If the number of UWB anchors 115 in the subset is two, then sufficient distance data will be available only after at least two search iterations. For another example, if the currently activatable feature relies on the distance to mobile device 110, then distance data is required from one UWB anchor 115, and sufficient distance data will be available after the first search iteration. If the trilateral calculation will be performed, the process 200 proceeds to a block 235. Otherwise, the process 200 proceeds to a decision block 245.

In the block 235, the computer 105 performs the trilateral calculation, as described above.

Next, in a block 240, the computer 105 actuates one of the components 120 of the vehicle 100 based on the currently activatable feature determined in the block 210 and on the result of the trilateral calculation from the block 235, as described above. For example, the actuation may be conditional on criteria specific to the currently activatable feature being met, e.g., the mobile device 110 being within a threshold distance, as described above. After the block 240, the process 200 proceeds to the decision block 245.

In the decision block 245, the computer 105 determines whether the currently activatable feature(s) require additional search iterations, e.g., updated results of the trilateral calculation, an updated set of mobile devices 110, etc. If so, the process 200 proceeds to a decision block 250. If not, the process 200 ends.

In the decision block 250, the computer 105 determines whether the currently activatable feature and/or the power state have changed, as described above. If so, the process 200 returns to the block 220 to proceed with the next search iteration. If not, the process 200 returns to the block 210 to determine the new currently activatable feature and/or power state.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first," "second," etc. are used throughout this document as identifiers and are not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer comprising a processor and a memory, the memory storing instructions executable to:

determine a currently activatable feature on a vehicle from a plurality of features;

establish negotiations between each of a plurality of Ultra-Wideband (UWB) anchors of the vehicle and at least one mobile device;

select a search strategy from a plurality of search strategies based on the currently activatable feature;

upon selecting a first strategy as the search strategy, during a search iteration, determine distance data to the at least one mobile device from a first subset of the UWB anchors of the vehicle, and inhibit a remainder of the UWB anchors other than the first subset, wherein the first strategy defines the first subset;

perform a trilateral calculation on the distance data for the at least one mobile device; and actuate a component of the vehicle according to the currently activatable feature based on a result of the trilateral calculation.

2. The computer of claim 1, wherein the first strategy defines the first subset to include different ones of the UWB anchors at consecutive search iterations.

3. The computer of claim 2, wherein the first strategy defines the first subset to include a same number of the UWB anchors at consecutive search iterations.

4. The computer of claim 3, wherein the number of the UWB anchors in the first subset is one.

5. The computer of claim 3, wherein the number of the UWB anchors in the first subset is greater than one and less than all the UWB anchors.

6. The computer of claim 2, wherein the first strategy defines the first subset according to a preset sequence specifying the UWB anchors for each search iteration.

7. The computer of claim 6, wherein the preset sequence includes all the UWB anchors in the first subset over a number of consecutive search iterations.

8. The computer of claim 6, wherein the at least one mobile device includes a first mobile device and a second mobile device, the first strategy defines a first sub-subset of the first subset to determine the distance data from the first mobile device and a second sub-subset of the first subset to determine the distance data from the second mobile device, and a first one of the UWB anchors is in the first sub-subset and in the second sub-subset in different ones of the search iterations.

9. The computer of claim 6, wherein the at least one mobile device includes a first mobile device and a second mobile device, the first strategy defines a first sub-subset of the first subset to determine the distance data from the first mobile device and a second sub-subset of the first subset to determine the distance data from the second mobile device, the first sub-subset includes a first one of the UWB anchors in at least one of the search iterations of the preset sequence, and the first sub-subset is a null set in a remainder of the search iterations of the preset sequence.

10. The computer of claim 9, wherein the second sub-subset excludes the first one of the UWB anchors.

11. The computer of claim 2, wherein the instructions further include instructions to, upon selecting the first strategy as the search strategy, during a next search iteration, deselect at least one of the UWB anchors from the first subset based on a distance from the UWB anchor to the at least one mobile device.

12. The computer of claim 11, wherein the instructions further include instructions to continue excluding the deselected one of the UWB anchors from the first subset after the next search iteration.

13. The computer of claim 11, wherein the instructions further include instructions to, upon selecting the first strategy as the search strategy, during an initial search iteration, determine the distance data to the at least one mobile device from all the UWB anchors of the vehicle.

14. The computer of claim 1, wherein the instructions further include instructions to actuate the component of the vehicle according to the currently activatable feature based directly on a distance from the distance data.

15. The computer of claim 1, wherein the at least one mobile device includes a first mobile device and a second mobile device, and the first strategy defines a first sub-subset of the first subset to determine the distance data from the first mobile device and a second sub-subset of the first subset to determine the distance data from the second mobile device.

16. The computer of claim 1, wherein the instructions further include instructions to, before selecting the search strategy, establish the negotiations using a Bluetooth® Low Energy (BLE) transceiver.

17. The computer of claim 1, wherein the plurality of the features includes at least one of (1) proximity-based unlocking of the vehicle, (2) actuating the component on approach of the at least one mobile device to the vehicle, or (3) remote park assist.

18. The computer of claim 1, wherein the plurality of the search strategies includes a default strategy, and the instructions further include instructions to, upon selecting the default strategy as the search strategy, during the search iteration, determine the distance data to the at least one mobile device from all the UWB anchors of the vehicle.

19. A computer comprising a processor and a memory, the memory storing instructions executable to:

determine a currently activatable feature on a vehicle from a plurality of features;

select a search strategy from a plurality of search strategies based on the currently activatable feature;

upon selecting a first strategy as the search strategy, during a search iteration, determine distance data to at least one mobile device from a first subset of a plurality of Ultra-Wideband (UWB) anchors of the vehicle, and inhibit a remainder of the UWB anchors other than the first subset, wherein the first strategy defines the first subset;

perform a trilateral calculation on the distance data for the at least one mobile device; and actuate a component of the vehicle according to the currently activatable feature based on a result of the trilateral calculation;

wherein the first strategy is one of (1) defines the first subset to have a number of the UWB anchors equal to one, (2) defines a first sub-subset of the first subset to determine the distance data from a first mobile device of the at least one mobile device and a second sub-subset of the first subset to determine the distance data from a second mobile device of the at least one mobile device, or (3) during a next search iteration, deselects at least one of the UWB anchors from the first subset.

20. A method comprising:

determining a currently activatable feature on a vehicle from a plurality of features;

establishing negotiations between each of a plurality of Ultra-Wideband (UWB) anchors of the vehicle and at least one mobile device;

selecting a search strategy from a plurality of search strategies based on the currently activatable feature;

upon selecting a first strategy as the search strategy, during a search iteration, determining distance data to the at least one mobile device from a first subset of the UWB anchors, and inhibiting a remainder of the UWB anchors other than the first subset, wherein the first strategy defines the first subset;

performing a trilateral calculation on the distance data for the at least one mobile device; and actuating a component of the vehicle according to the currently activatable feature based on a result of the trilateral calculation.

* * * * *